United States Patent [19]

Benoit et al.

[11] Patent Number: 5,507,207
[45] Date of Patent: Apr. 16, 1996

[54] CUT AND STRIP TOOL FOR INSULATED CONDUCTIVE WIRES

[75] Inventors: René Benoit, St. Basile Le Grand; François Gauthier, Sherbrooke; Marcel Belanger, Ste Julie; Denis Genois; Bernard Lefebvre, both of Montreal, all of Canada

[73] Assignees: Institut de Recherche et al.; Universite de Sherbrooke, Montreal, Canada

[21] Appl. No.: 409,440

[22] Filed: Mar. 24, 1995

[30] Foreign Application Priority Data

Dec. 2, 1994 [CA] Canada ............................ 2137474

[51] Int. Cl.⁶ .................................................. H02G 1/12
[52] U.S. Cl. ................................. 81/9.43; 30/90.1
[58] Field of Search ............................. 81/9.43, 9.42; 30/91.2, 90.1

[56] References Cited

U.S. PATENT DOCUMENTS

| | | | |
|---|---|---|---|
| 3,103,837 | 9/1963 | Allen et al. | 30/90.1 |
| 3,146,645 | 9/1964 | Hindenburg et al. | 81/9.43 |
| 3,736,606 | 6/1973 | Raum et al. | 81/9.43 |
| 3,765,277 | 10/1973 | Sorensen | 81/9.43 |
| 3,875,601 | 4/1975 | Kaufman | 81/9.43 |
| 3,913,425 | 10/1975 | Iff | 81/9.43 |

FOREIGN PATENT DOCUMENTS 1102842  3/1961  Germany ............................ 81/9.43

Primary Examiner—Willis Little
Attorney, Agent, or Firm—Merchant, Gould, Smith, Edell, Welter & Schmidt

[57] ABSTRACT

The disclosure herein describes a cut and strip tool to assist in the stripping of insulation from one or more insulated conductive wires; it comprises a pair of handles which are equipped, at their upper part, with an elongated wire receiving element including, at one end thereof, a cutting tool for completely severing the wire and, at the other end, a pair of wire receiving blades which make an incision in the insulation of the wires as they are inserted in the blades and which, upon actuation of the handles, initiate removal of a portion of the insulation so that the total effort for a complete insulation stripping operation is greatly reduced with the present tool as compared to that of conventional tools as a result of this initial insulation removal carried by the tool rather than by the operator.

15 Claims, 4 Drawing Sheets

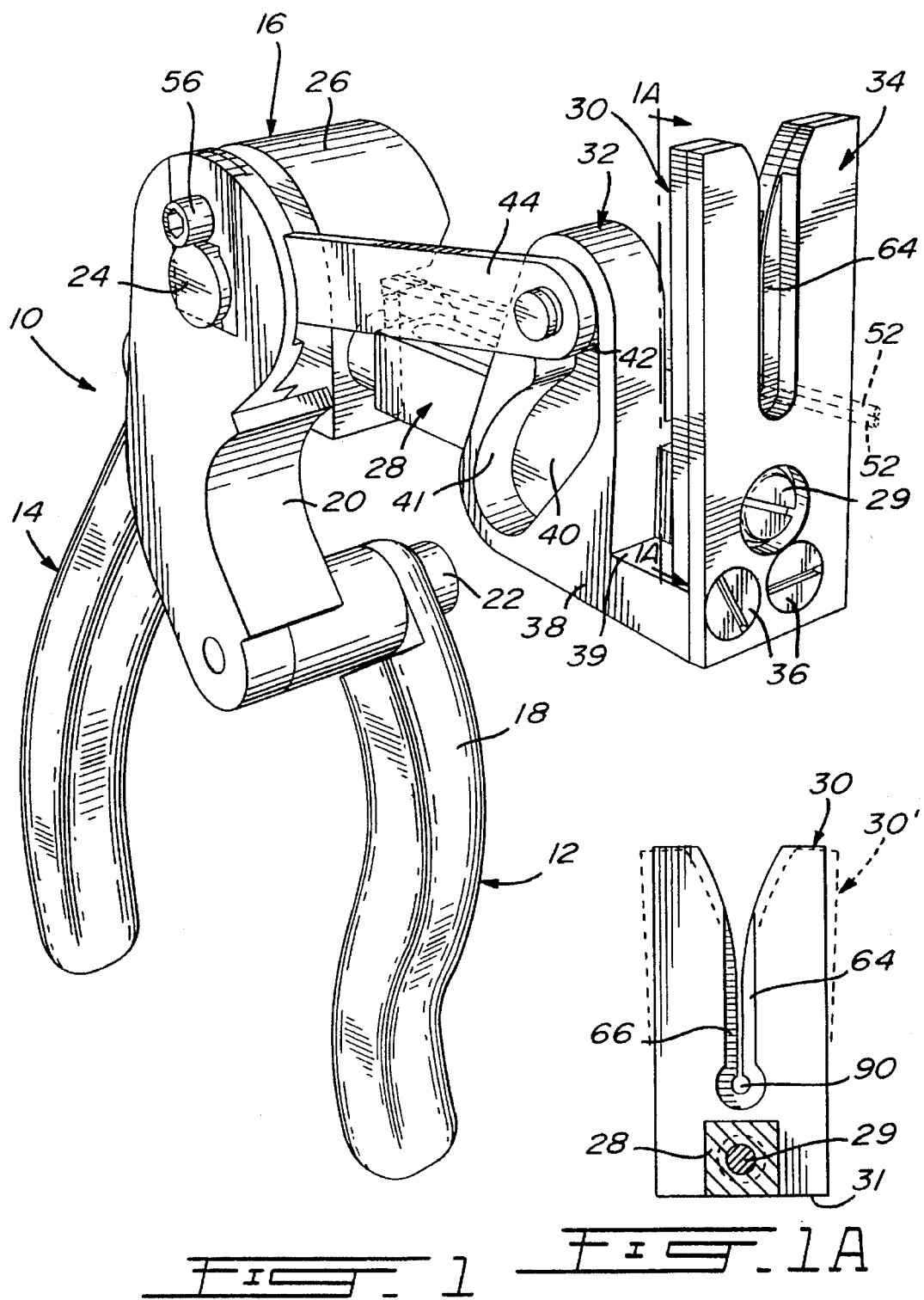

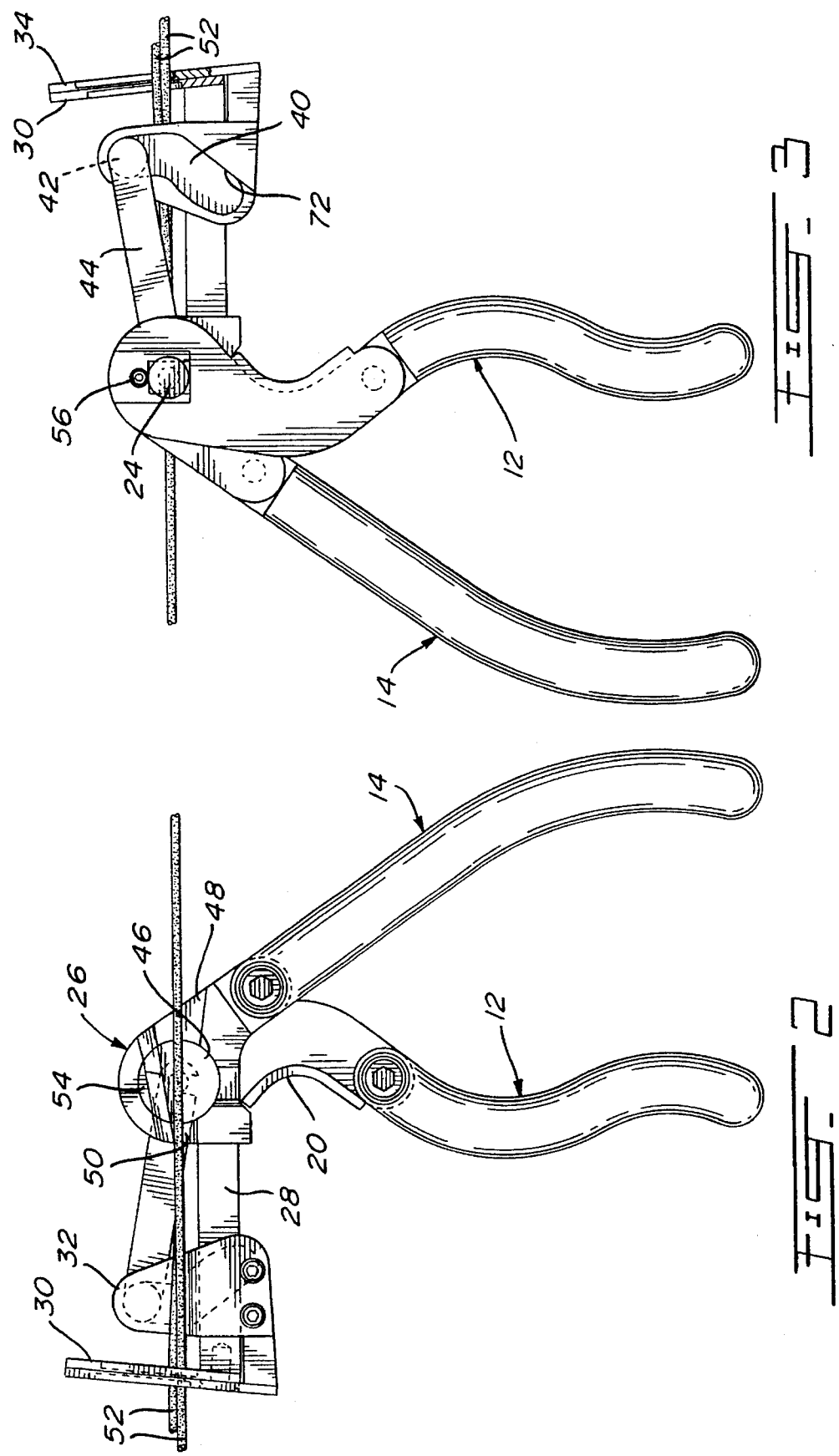

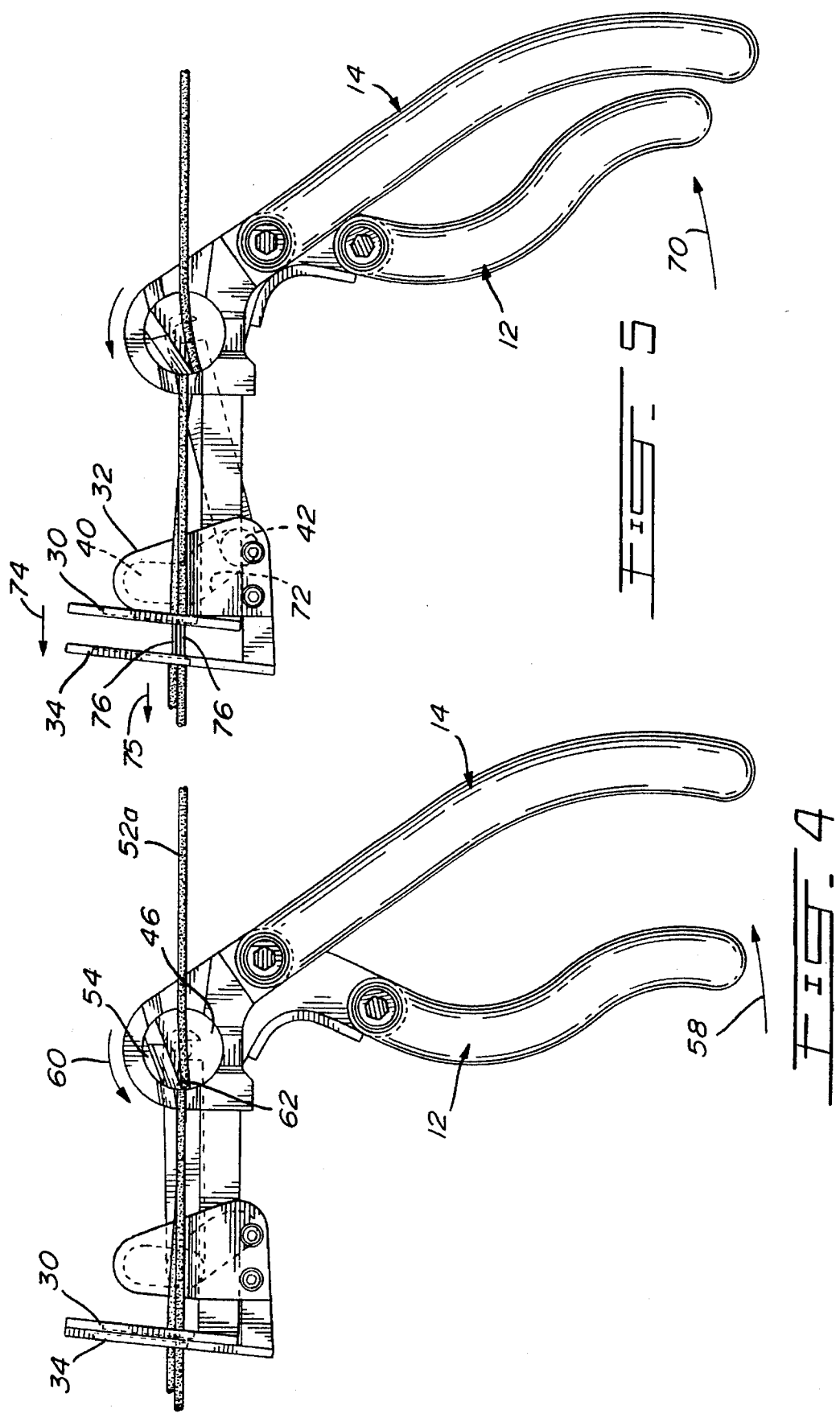

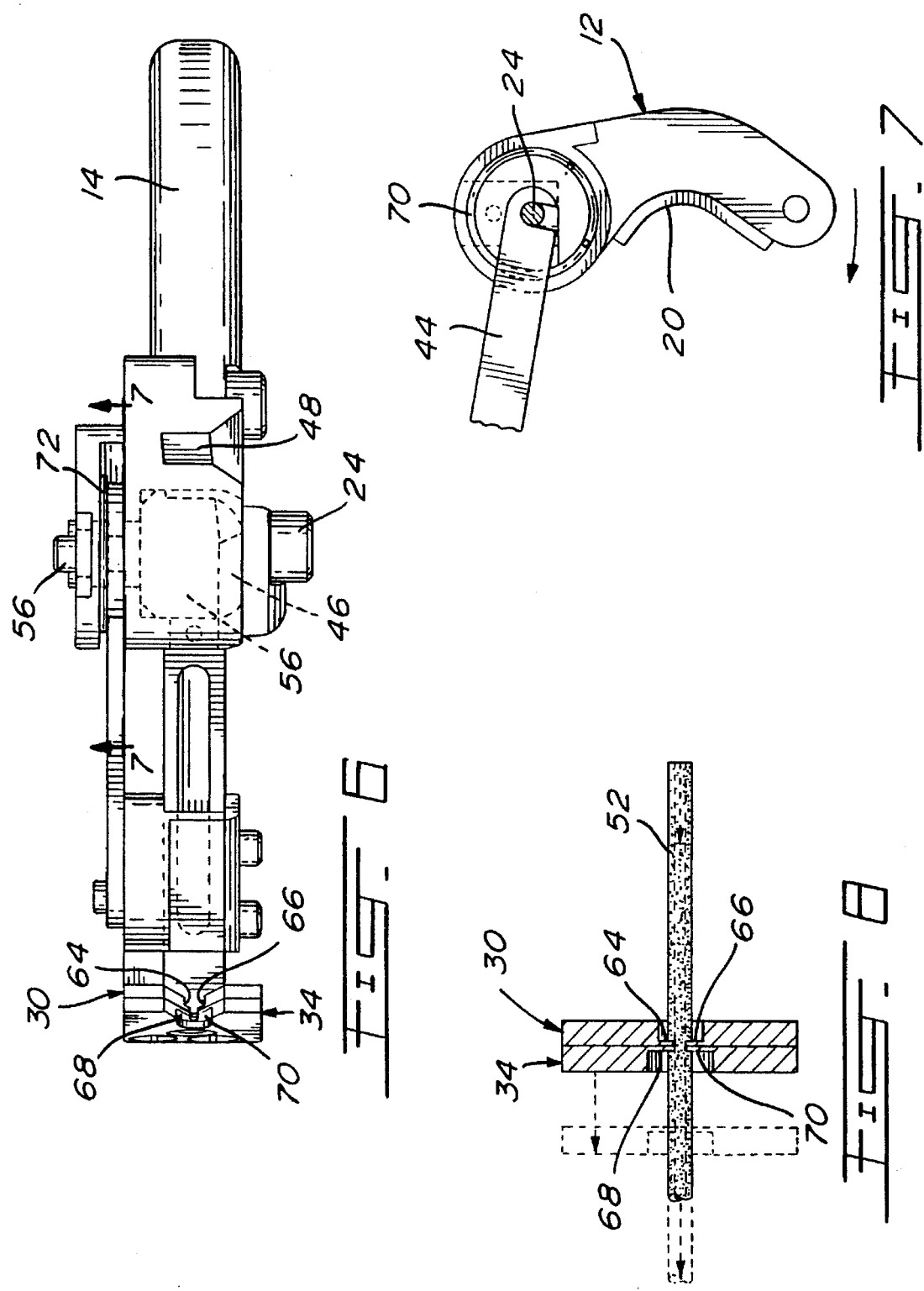

CUT AND STRIP TOOL FOR INSULATED CONDUCTIVE WIRES

FIELD OF THE INVENTION

The present invention pertains to a cut and strip tool to assist in the stripping of insulation from one or more insulated conductive wires.

BACKGROUND OF THE INVENTION

There are various types of tools which are available to cut and strip insulated conductive wires. Basically, the operation consists in initially cutting a wire and then in removing, from one end portion of the cut wire, the insulation covering the conductive portion of the wire. The end of the wire with the insulation removed is wrapped onto a post of an electrical conductor, such as a terminal board, a printed circuit board, or the like.

In practice, the operator uses a tool which cuts one end of the wire and makes an incision in the insulation of the wire at a given distance from the cut end thereof. The operator must then exerts a manual pull so that the insulation extending from the incised location to the cut end may be broken and stripped off the wire. This operation in some cases is carried out over 800 times per day and has resulted in what is known scientifically as cumulative trauma disorders (CTD) in operators. This is due principally in the efforts needed to cause the breaking of the insulation prior to is removal.

OBJECTS AND STATEMENT OF THE INVENTION

It is an object of the present invention to overcome the problems of presently used wire cutting and stripping tools by providing a tool which is easily manually operated and greatly reduces the pulling forces exerted by the operator.

This is achieved by providing a cut and strip tool which will assist in the stripping of insulation from one or more insulated conductive wires, which tool comprises:

actuatable hand gripping means;

elongated wire receiving means mounted at the upper end of the hand gripping means; the wire receiving means including:
  a) at one end thereof adjacent the hand gripping means, cutting means for completely severing the insulated wire;
  b) at an opposite end thereof, insulation incising means to make an incision in the one or more wires as it or they are inserted therein; the insulation incising means including insulation stripping means; and
  c) movable means associated with actuation of the hand gripping means and connected to the insulation stripping means for moving the insulation stripping means longitudinally away from the incision to break the insulation and to remove a portion of the insulation from the one or more wires.

In one form of the invention, the insulation incising means and the insulation stripping means consist of a pair of wire-receiving blades disposed side-by-side which allow the operator to practice an incision in the insulation of the wire as it is inserted in the blades and wherein one blade is then moved away from the other to break the insulation and initiate the stripping procedure.

The operation of the tool consists in the following steps. First, an incision is made on opposite sides of the one or more wires as they are inserted in the blades; the free ends of wires extend through the upper end of the hand gripping means. Upon actuation of the handles, the free ends are cut off and, then, the blades separate which results in the breaking of the insulation; continual movement of the handles causes a pre-stripping of the insulation as one blade moves away from the other. The complete insulation removal is then effected by the operator pulling the tool in the direction of the free ends of wires.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a perspective view of a cut and strip tool made in accordance with the present invention;

FIG. 1a is a front elevation of one of the blades of the tool as seen from lines 1a—1a of FIG. 1;

FIG. 2 is a side elevation of the tool with a pair of wires inserted in the tool prior to the cutting operation;

FIG. 3 is a side elevation similar to that of FIG. 2, showing the opposite side of the tool;

FIG. 4 is a side elevation of the tool similar to that of FIG. 2 showing the wire cutting operation;

FIG. 5 is a side elevation showing the initial insulation removal operation;

FIG. 6 is a top plan view of the tool;

FIG. 7 is a cross-sectional view taken along lines 7—7 of FIG. 6; and

FIG. 8 is a schematic illustration of the insulation breaking and stripping operations.

DESCRIPTION OF PREFERRED EMBODIMENTS

Referring to FIG. 1, there is shown a tool, generally denoted 10, which comprises a pair of handles 12 and 14, the upper end of which displays a wire receiving area, generally denoted 16.

The handle 12 includes a hand gripping curved portion 18 and a finger gripping portion 20, both portions being interconnected at 22 in a manner that the position of the curved portion 18 relative to handle 14 may be adjusted to suit various hand sizes of operators. The handles 12 and 14 are mounted at their upper end 26 to pivot about an axis 24 as described further hereinbelow.

From the upper end of the handles extends an elongated horizontal support member 28. The opposite end of the support member 28 displays a first blade 30 mounted to the extremity of the support member. As can be seen in FIG. 1a, blade 30 is mounted to support 28 by means of a bolt 29 which will allow a slight pivotal movement as shown by dotted lines 30'.

A drawer 32 is mounted to slide on the support member 28. A second blade 34 is secured by appropriate fastening means 36 to one end of the drawer and extends vertically substantially parallel to the blade 30. One side wall 38 of the drawer comprises a cavity 40 which includes a cam surface 41 and in which is mounted a roller 42 connected at one end of lever arm 44, the latter having its opposite end mounted to the pivot 24.

Referring to FIG. 2, the upper end 26 of handle 14 defines a circular cavity or barrel 46 displaying a pair of opposite slots 48 and 50. Although the tool of the present invention may be used to cut a single wire, most often it will be used for stripping and cutting a pair of wires. Hence, two wires 52 extend horizontally through slots 48 and 50 as well as through the circular cavity 46 of the barrel. An arc-shaped cutting element 54 is lodged within the cavity. This cutter is fixedly attached, by appropriate means 56, to the upper end of handle 12 so that actuation of this handle (as indicated by arrow 58 in FIG. 4) will cause its rotation (as shown by arrow 60). The rotary cutter 54 has a cutting edge 62 which will sever the wires 52.

The blades 30 and 34 have identically shaped upper portions, each defining an elongated notch defined by opposite facing edges 64 and 66 (for blade 30) and 68 and 70 (for blade 34). As shown in FIG. 1, two wires 52 are inserted vertically in the notches of the blades 30 and 34, which have a spacing between their cutting edges such that an incision will be made in their insulation as they are forcingly inserted in the notches.

The two wires are shown vertically disposed relative to one another in the blades; however, they lie in a side-by-side horizontal parallel position when they extend through slots 48 and 50 of the barrel cavity 46.

As shown in FIG. 4, when the handle 12 is first pivoted in the direction of arrow 58, the rotary cutter 54 will rotate in the direction 60 and the cutting edge 62 will completely sever the wires and the cut ends 52a of the wires will fall off.

As the handle 12 is further moved, as indicated by arrow 70 in FIG. 5, towards the fixed handle 14, the lever arm 44 moves downward in the cavity 40 of the slides 32 and cam roller 42 will contact surface 72, opposite surface 41 of the cavity. As it moves downwards to reach the position shown in FIG. 5, the cam roller causes the drawer to move in the direction indicated by arrow 74. Blade 34 which is fixedly connected to the drawer 32 also moves in the same direction as indicated by arrow 75; this results in breaking off the insulation and causing an initial removal of insulation to expose a portion of the metallic conductive wire 76. The displacement of blade 34 away from blade 30 is limited by the cam roller 42 reaching the bottom of the cavity 40.

The operator can now, without great efforts, remove the remaining portion of the insulation from wires 52 by simply pulling the tool in a direction opposite to that of the arrow 74, thus exposing the entire conductive wires to their free ends.

Thus, by now providing a tool that will cause the breaking of the insulation and its initial removal, efforts made by the operator are greatly reduced as compared to standard cutting tools where the greatest manual efforts were carried out by the operator from the incision point on.

The slight pivotal movement of blade 30 (as illustrated in FIG. 1a) ensures that the inserted wires will automatically place the notches of blades 30 and 34 in exact position relative to each other. The pivotal movement of blade 30 is limited by its bottom edge 31 contacting top wall 39 of the slider.

Although the invention has been described above with respect to one specific form, it will be evident that it may be modified and refined in various ways. For example, by providing at the bottom of the notch of blade 30 an enlarged circular opening 90, any insulation retained in the notch, will be push downward in this opening and fall off the tool as successive wires are inserted in the notches for further incising and stripping. It is therefore wished to have it understood that the present invention should not be limited in interpretation, except by the terms of the following claims.

The embodiments of the invention in which an exclusive property or privilege is claimed are defined as follows:

1. A cut and strip tool to assist in the stripping of insulation from one or more insulated conductive wires comprising:

actuatable hand gripping means;

elongated wire receiving means mounted at the upper end of said hand gripping means; said wire receiving means including:

a) at one end thereof adjacent said hand gripping means, cutting means for completely severing said insulated wire;

b) at an opposite end thereof, insulation incising means to make an incision in said wire as said wire is inserted therein: said insulation incising means including insulation stripping means; and c) movable means associated with actuation of said hand gripping means and connected to said insulation stripping means for moving said insulation stripping means longitudinally away from the incision to break the insulation and to remove a portion of said insulation from said wire.

2. A tool as defined in claim 1, said wire receiving means including a longitudinal support member having one end mounted at the upper end of said hand gripping means; said movable means being longitudinally displaceable along said member.

3. A tool as defined in claim 2, wherein said insulation incising means consist of a first blade mounted at an opposite end of said support member.

4. A tool as defined in claim 3, wherein said blade displays a wire receiving notch having sharp facing edges on opposite sides thereof.

5. A tool as defined in claim 4, wherein said notch displays, at the bottom end thereof, an enlarged area.

6. A tool as defined in claim 4, wherein said first blade is loosely secured to said opposite end of said support member to allow pivotal adjustment of said notch relative to said insulation stripping means.

7. A tool as defined in claim 3, wherein said insulation incising means consist of a second blade defining said insulation stripping means.

8. A tool as defined in claim 7, wherein said movable means include a drawer longitudinally and slidably mounted on said support member; said second blade being fixedly attached to said drawer and movable therewith to strip a portion of the insulation off the wire as it is being moved.

9. A tool as defined in claim 8, wherein said second blade displays a wire receiving notch having sharp facing edges on opposite sides thereof.

10. A tool as defined in claim 8, wherein said drawer displays a cam surface; said movable means further comprising a lever having one end pivotally mounted to said upper end of said hand gripping means and having, at an opposite end thereof, a follower bearing against said cam surface whereby actuation of said hand gripping means causes said one end of said lever to pivot and said follower to displace said drawer longitudinally on said support member.

11. A tool as defined in claim 1, wherein said upper end of said hand gripping means defines a barrel; said cutting means includes a rotatable cutting member received in said barrel and mounted to said hand gripping means; said cutting member being rotated through actuation of said hand gripping means; said cutter defining a cutting edge to sever said wire.

12. A tool as defined in claim 11, wherein said hand gripping means include a fixed handle and a movable handle; said barrel being provided in said fixed handle; said cutting member being fixedly connected to said movable handle and being movable in said barrel.

13. A tool as defined in claim 12, further comprising means on said movable handle to adjust the position of said movable handle relative to said fixed handle.

14. A tool as defined in claim 12, comprising spring means at said upper end of said hand gripping means for returning said movable handle to an initial position after cutting and stripping operations.

15. A tool as defined in claim 11, wherein said barrel includes diametrically spaced wire receiving slots allowing wires to extend through said barrel for cutting.

* * * * *